Figure 1:
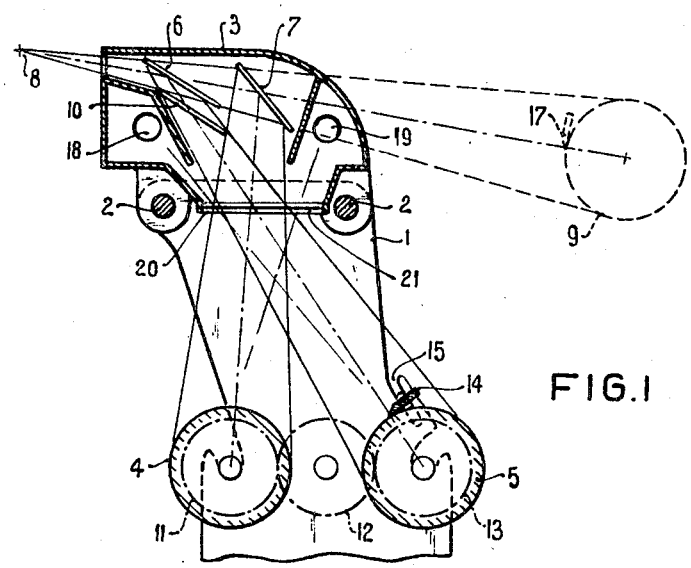

May 12, 1959             M. CAHEN            2,885,924
OPTICAL APPARATUS FOR USE IN ACCURATELY POSITIONING PRINTING PLATES ON A PRINTING CYLINDER

Filed Nov. 10, 1954            2 Sheets—Sheet 1

INVENTOR
MAX CAHEN
by Bradley Cohn
ATTORNEY

United States Patent Office 2,885,924
Patented May 12, 1959

2,885,924

OPTICAL APPARATUS FOR USE IN ACCURATELY POSITIONING PRINTING PLATES ON A PRINTING CYLINDER

Max Cahen, 's-Hertogenbosch, Netherlands

Application November 10, 1954, Serial No. 468,117

Claims priority, application Netherlands November 17, 1953

3 Claims. (Cl. 88—14)

The invention relates to an apparatus for accurately positioning printing plates on a printing cylinder.

Apparatus of this kind are already known, which comprise a frame, means for rotatably supporting in said frame a printing cylinder to be provided with printing plates, a separate adjustable key member for determining the positions of the printing plates on said cylinder and mounted for cooperation with said cylinder, an optical system for the observation of both the printing cylinder and the key member and a mirror forming part of said optical system and comprising a plane transparent plate, of which the surface facing the observer is partially reflecting and partially transparent, said mirror combining the beam of light from the printing cylinder and that from the key member and thereby producing for the observer superimposed images of said cylinder and said member.

In these known apparatus the images of the cylinder to be provided with printing plates and the key member, which also may be a cylinder, are brought into register by means of the said half transmitting half reflecting mirror. This means that the beam of light from one of said articles, say cylinders, has to pass the transparent plate of the mirror and will be refracted thereby, whereas the beam reflected by the mirror will not be refracted. This difference of behaviour of the two beams results in a parallax which depends on the index of refraction and the thickness of the mirror plate and makes it impossible to bring the said images accurately into register.

The invention has the object to avoid the mentioned disadvantage of the known apparatus. It consists in that provided in the incident portion of the beam reflected by the half transmitting half reflecting mirror is a plane transparent auxiliary plate, of which the index of refraction and the thickness are selected to correct the deviation from register of the superimposed images due to the parallax of the transmitted beam caused by the mirror plate. According to the invention both beams have to pass transparent plates and will be refracted thereby. Preferably the indices of refraction and the thicknesses of the mirror plate and the auxiliary plate are equal.

The principle according to the invention may also be used in case the images of more than two articles must be compared with one another or brought into register. These articles may be for instance two cylinders and a key member. In that case the optical system of the apparatus must comprise at least two partially reflecting partially transmitting mirrors for combining the beams from said articles and a definite number of plane transparent auxiliary plates must be mounted in the incident portion of each beam reflected by such a beam combining mirror, said number being equal to the number of partially reflecting partially transmitting mirrors passed by the beam transmitted by all mirrors before reaching the reflecting surface of the mirror in question. It will be obvious that, when of a set of auxiliary plates mounted in one and the same beam the indices of refraction are equal, these plates may be combined to one plate having a thickness equal to the sum of the thicknesses of the individual plates.

Figure 2:
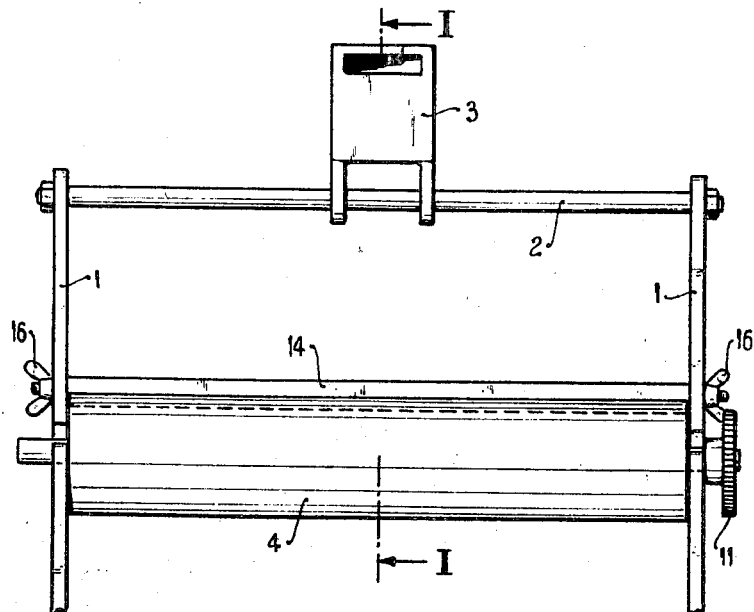
Figure 3:
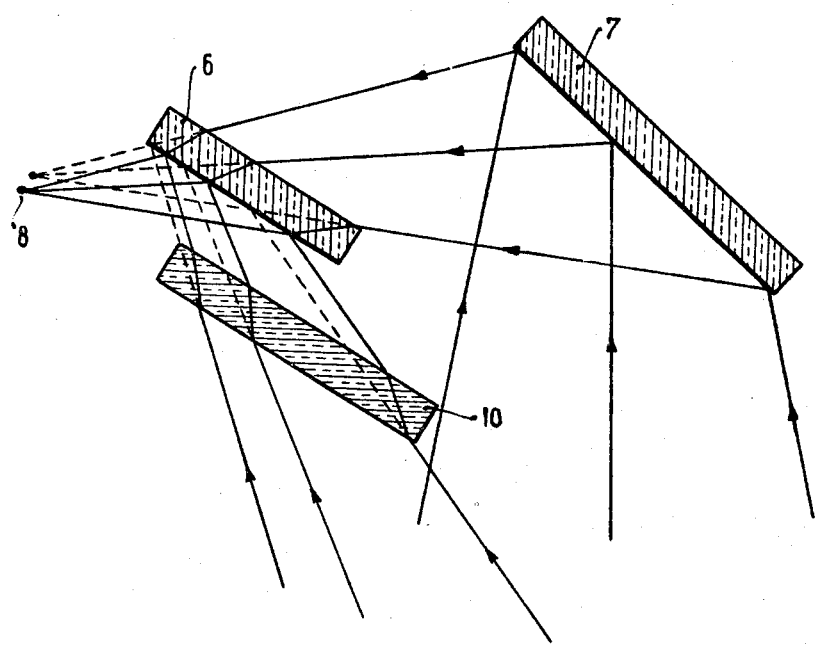

For the elucidation of the invention reference is made to the accompanying drawing, in which:

Fig. 1 is a vertical cross sectional view of an apparatus according to the invention, in which a bar scale or a printing cylinder, which has already been provided with printing plates, is used as a key member, Fig. 2 is a front view of said aparatus and Fig. 3 is a diagram of the optical system of the apparatus according to Figs. 1 and 2.

In the drawing 1 denotes a frame. The brackets of the frame are interconnected by rods 2 lying outside the field of vision. A housing 3 comprising an optical system is slidably mounted on said rods. The frame 1, 2 is so constructed as to permit two printing cylinders 4, 5 to be rotatably supported therein. The optical system comprises two mirrors 6, 7. With respect to the point of observation 8 the mirror 6 forms an image of the cylinder 5 and said image coincides with the image of the printing cylinder 4 formed for the same point of observation by the mirror 7. The two images are superimposed on the spot denoted by 9. The mirror 6 is partially reflecting partially transparent or transmitting, so that it is possible to look through the mirror 6 in the mirror 7. The mirrors have reflecting surfaces on their sides facing the observer.

In order to avoid as much as possible the duplication of the image of the cylinder 5 owing to the reflection on both surfaces of the plate of the mirror 6, the front surface of said mirror plate may be provided with a reflection increasing layer and the backsurface of said plate may be covered with a reflection decreasing layer.

If the optical system should only consist of the two mirrors referred to, the beam of light from the cylinder 4 would pass a plane transparent plate, viz. the plate of the mirror 6, whereas the beam of light from the cylinder 5 would not pass through such a plate. This would mean that the first beam would be refracted, whereas the second beam would not. The result thereof would be that, even in case the mirrors are adjusted with respect to the cylinders in most accurate manner, the images of the cylinders will never be in exact register. In order to solve this problem according to the invention there is mounted in the beam extending between the cylinder 5 and the mirror 6 a plane transparent auxiliary plate 10 parallel to the mirror plate 6 and having a thickness and an index of refraction equal to those of said mirror plate 6. It will be apparent that when such an auxiliary plate is used both the beam from the cylinder 5 and that from the cylinder 4 have to pass through a plane plate and will be refracted thereby. In that case the parallaxes in both beams are equal, so that accurately coinciding images are obtained.

It will be understood, that, when the cylinder 5 has already been provided with printing plates and the cylinder 4 has to be covered with printing plates in a corresponding manner, the coincidence of the images of these cylinders will considerably facilitate the determination of the positions of said printing plates on the cylinder 4. When the cylinder 5, which has already been provided with printing plates, is used as key member said cylinder will have to be coupled without any clearance with the cylinder 4 to be treated. In the illustrated embodiment said coupling is effected by toothed wheels 11, 12, 13.

It is also possible to project a scale on the image of the cylinder 4. In that case a bar 14 provided with a scale is placed against the cylinder 5.

Provided in the housing 3 of the optical system are two electrical lamps 18, 19, of which the lamp 18 is so positioned and surrounded by screens as to illuminate the key member, that means the cylinder 5 or the bar scale 14, only. On the other hand the lamp 19 illuminates only the cylinder 4, which has to be provided with printing plates. By regulating the supply tension of the lamps 18, 19 it is possible to freely adjust the light intensities of the coinciding images.

Fig. 3 shows on a larger scale the optical system and it will be seen therefrom that the two beams to be combined by the mirror 6 will have to pass each through a plane transparent plate and that, when the indices of refraction and the thicknesses of the plates 6 and 10 are equal, the parallaxes caused in both beams will be also equal.

What I claim is:

1. In a system for accurately adjusting one member with respect to a second member, means for adjusting at least one of said members with respect to said other member, an optical system for the observation of both said members comprising a mirror to reflect the image of said one member toward an observing station, a second mirror to reflect the image of said second member toward said observing station, said mirror being positioned in the reflected beam of the image of said one member from said first mirror, said second mirror being a plane transparent plate of which the surface toward said observing station is partially reflecting and partially transparent and a plane transparent plate having refractive characteristics substantially the same as said second mirror, said plate being positioned in the incident beam from said second member to the reflecting surface of said second mirror, said plate correcting the deviation from register of the superimposed images due to the refraction of the transmitted beam in its passage through the plate of said second mirror.

2. An apparatus for accurately registering the printing surfaces of one cylinder with the surfaces of another cylinder, comprising in combination a frame constructed to removably and rotatively mount the said cylinders in parallelism and an optical system for observing said cylinders from one point of observation, a first mirror positioned in said optical system comprising a plane transparent plate having a surface toward said point of observation partially reflecting and partially transparent, a second mirror positioned to reflect a beam of light from a first cylinder of said cylinders toward said point of observation and through said partially reflecting partially transparent mirror, said first mirror transmitting a beam of light reflected by said second mirror and reflecting a beam of light from the second cylinder of said cylinders to produce for the observer superimposed images of said cylinders and a plane transparent auxiliary plate provided only in the incident portion of the beam reflected by said first mirror to correct the refraction from register of the superimposed images due to parallax in the beam passing through said first mirror.

3. An apparatus according to claim 2 for at least three articles to be compared with one another, such as two printing cylinders and a key member, and provided with an optical system comprising at least two partially reflecting partially transmitting mirrors for combining the beams from said articles, characterized in that in the incident portion of each beam reflected by such a beam combining mirror a definite number of plane transparent plates are mounted, said number being equal to the number of partially reflecting partially transmitting mirrors passed by the beam transmitted by all mirrors before reaching the reflecting surfaces of the mirror in question, and a mirror positioned to reflect a beam of light from the third of said three articles toward and through said partially reflecting partially transmitting mirrors.

References Cited in the file of this patent

UNITED STATES PATENTS

| | | |
|---|---|---|
| 2,289,557 | Taylor | July 14, 1942 |
| 2,405,063 | Sisson | July 30, 1946 |
| 2,493,628 | Harley | Jan. 3, 1950 |
| 2,570,219 | Drake | Oct. 9, 1951 |
| 2,571,937 | Peck | Oct. 16, 1951 |
| 2,672,072 | Sachtleben et al. | Mar. 16, 1954 |
| 2,701,521 | Taylor | Feb. 8, 1955 |